Dec. 19, 1950     J. W. GRAY     2,534,712
APPARATUS FOR MEASURING AIRSPEED
Filed Nov. 30, 1945     2 Sheets—Sheet 1
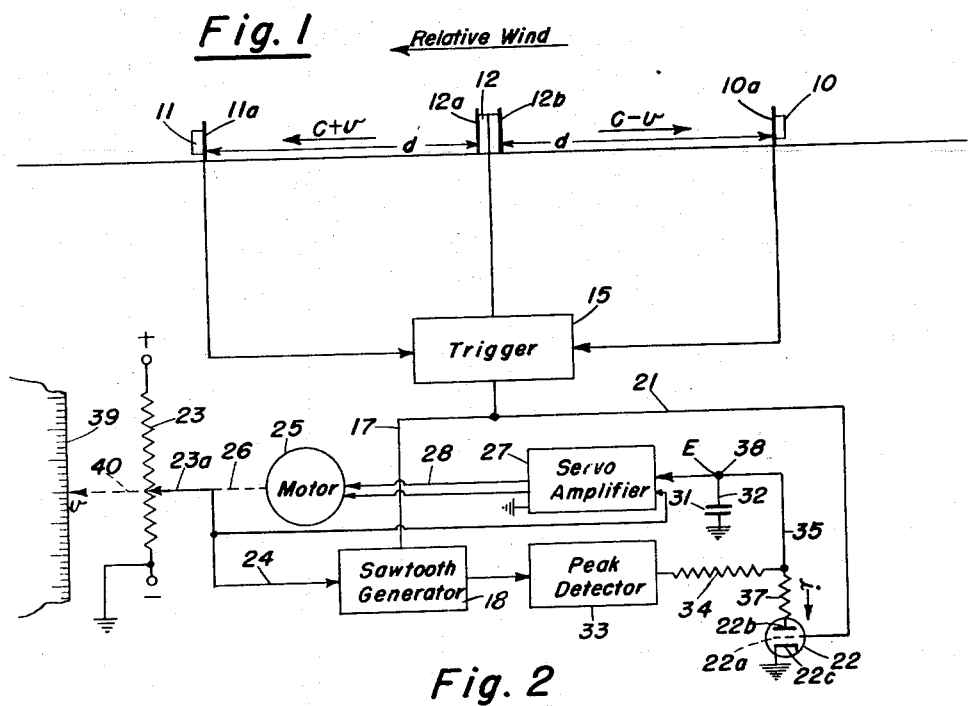
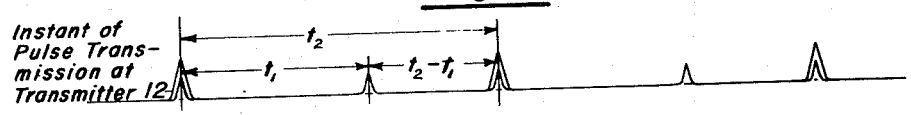
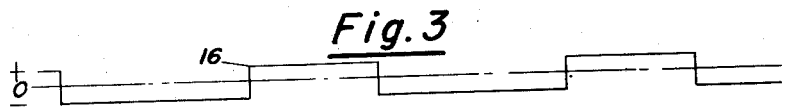
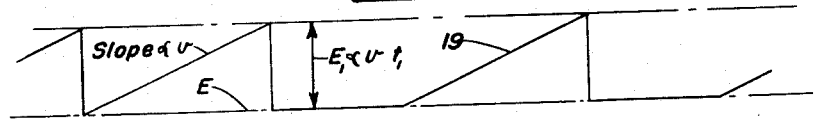
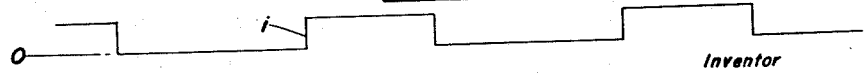
Inventor
John W. Gray
By M. O. Hayes
Attorney Dec. 19, 1950  J. W. GRAY  2,534,712
APPARATUS FOR MEASURING AIRSPEED
Filed Nov. 30, 1945  2 Sheets-Sheet 2

Inventor
John W. Gray
Attorney

Patented Dec. 19, 1950

2,534,712

UNITED STATES PATENT OFFICE 2,534,712

APPARATUS FOR MEASURING AIR SPEED

John W. Gray, Cambridge, Mass., assignor, by mesne assignments, to the United States of America as represented by the Secretary of the Navy Application November 30, 1945, Serial No. 631,958

8 Claims. (Cl. 73—194)

1

This invention relates in general to apparatus for measuring airspeed.

The general object of the invention is to provide an apparatus of the class described in which airspeed is measured as a function of the velocity of sonic wave pulses in the air.

A more specific object is to provide a speed-measuring apparatus in which a change in airspeed is measured as a function of the change in difference in the time interval required by a sonic pulse to travel from a transmitter to two receivers, all of which are placed in a line parallel to the direction of airflow with the transmitter being located midway between the two receivers.

These and other objects of the invention will become more apparent from the detailed description to follow and from the accompanying drawings which show the preferred embodiment.

In the drawings,

Fig. 1 is a circuit diagram of the electronic and sonic components of my improved airspeed measuring apparatus;

Fig. 2 is a plot showing the sonic pulse transmission as related to time;

Fig. 3 is a plot showing the relationship between a gating control signal used in the apparatus and the sonic pulses which are transmitted;

Fig. 4 is a plot showing a sawtooth voltage wave produced by a wave generator component of the apparatus and its relationship in point of time to the gating signal;

Fig. 5 is a plot showing the characteristic of current flow through a control tube used in the apparatus, also with respect to time;

Figure 6:
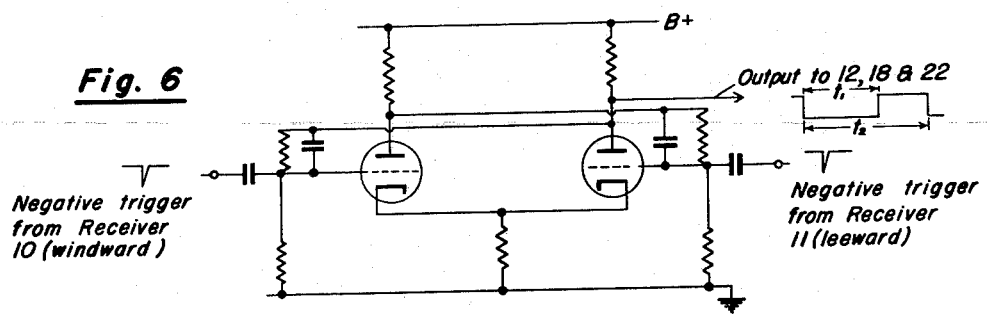
Figs. 6 to 8 are typical circuits which may be used in the trigger, sawtooth generator, and peak detector, respectively.

Referring now to Fig. 1, my improved airspeed measuring apparatus is seen to include a pair of sonic wave transducers or receivers 10 and 11 of any conventional construction capable of adequate response to sonic signal pulses of comparatively brief duration, and which produce a voltage when the sonic wave strikes the sound-sensitive elements 10a and 11a thereof. Thus, the receiver may be of the electromagnetic, piezoelectric, or magnetostrictive type. Located midway between the two receivers 10, 11 and in line therewith is a sonic wave transmitter 12. The latter has opposed transmitting faces or diaphragms 12a and 12b so that sonic pulses will be sent out simultaneously in opposite directions toward the two receiver elements 10 and 11. The

2 transmitter may be of the same construction as the receivers.

The in-line array of receivers 10, 11 and transmitter 12 is placed parallel to the direction of the airflow, the latter being indicated in Fig. 1 by an arrow bearing the legend "relative wind." With the components in the position shown, receiver 10 may thus be designated the "up-wind" receiving unit and receiver 11 as the "down-wind" receiving unit.

Connected in circuit with the output of receivers 10 and 11 is a trigger circuit component 15. The latter controls operation of the transmitter 12 and also supplies a gating voltage 16 (Fig. 3) which alternates from a positive to a negative value. The circuit arrangement in the trigger component 15 is such that each time a sonic pulse reaches the up-wind receiver 10, a new sonic pulse is transmitted from the transmitter unit 12.

A typical trigger circuit which may be used is shown in Fig. 6. This is of the Eccles-Jordan type, having two stable states and two trigger input points, as shown.

Figure 7:
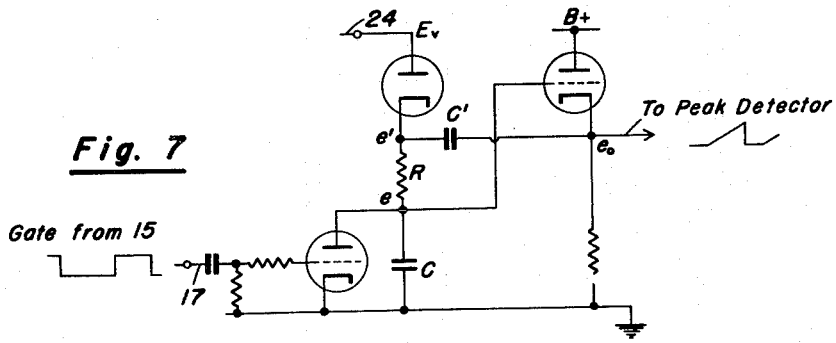

The gating voltage derived from the trigger component 15 is branched via conductor 17 to control the operation of a sawtooth wave generator 18 of conventional construction, having a circuit for example such as shown in Fig. 7. This sawtooth generator has a gated, linearized sweep circuit, with linear voltage control of rate of rise. The first triode acts as a switch which opens when its grid gets the negative gate. C then begins to charge with a current $$\frac{e'}{R}$$

so e starts rising at a rate $$\frac{e'}{R}$$

The initial value of $e'$ is practically $E_v$, the voltage from the velocity potentiometer 23, through conductor 24. If $e'$ were fixed to $E_v$, $e$ would rise exponentially toward $e'$ at the time constant of RC. But as $e$ rises, the cathode follows output $e'$ up with it via C', which is very large compared with C. Thus during the sweep $e'-e$ is practically constant, and so is the current in C, and the rate of $e$ and $e_0$. When the gate input rises again, $e$ is clamped down so that $e_0$ falls back to its base level. The fact that $e$ is not clamped completely to ground by the triode, and that the diode drop is not zero before the sweep, is allowed for by giving $E_v$ some small positive potential when the velocity dial reads zero. Thus, when the gating voltage 16 swings negative, generator 18 is "triggered" or keyed on and begins to generate a uniformly increasing voltage wave 19 as shown in Fig. 4.

The gating voltage also branches via conductor 21 to feed the grid 22a of a triode 22 which is biased to cut-off when the gating voltage is negative. The cathode 22c is grounded. As the gating voltage swings positive, tube 22 becomes conductive, and simultaneously therewith the sawtooth wave generator 18 is cut off. The characteristic of the current flow $i$ through tube 22 is shown by Fig. 5.

The slope of the sawtooth voltage wave 19 produced by generator 18 is determined by a control voltage taken from a potentiometer 23, the latter voltage being applied to generator 18 via conductor 24. The setting of potentiometer 23 is controlled by a motor 25, the drive shaft 26 of the motor being connected to actuate potentiometer arm 23a. Motor 25 is of a type which can rotate in either direction. The particular direction in which this motor rotates is determined by the polarity of another control voltage that constitutes the output of a servo amplifier unit 27, this voltage being applied to the motor 25 via conductor 28. The polarity of the output of the servo amplifier 27 is, in turn, determined by the magnitude of an input voltage E determined by the average charge on a condenser 31. One plate of the latter is connected to servo amplifier 27 via conductor 32, and the other plate is grounded.

Figure 8:
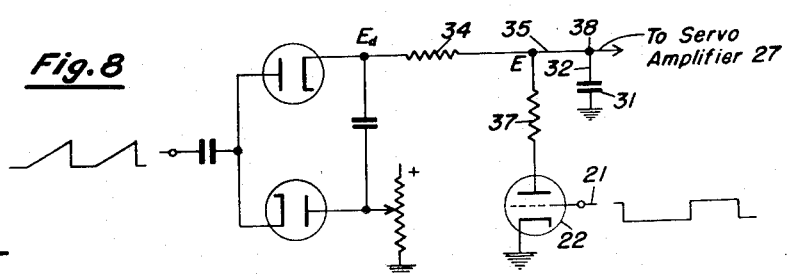

Connected to the output of the sawtooth generator 18 is a peak voltage detector unit 33 which must convert to a D.-C. potential the amount of rise of the sawtooth from its base level. A peak-to-peak diode detector shown in Fig. 8 is perhaps the most suitable. The output of the peak voltage detector is connected to one end terminal of a resistor 34. The level of this output $E_d$ with no input sawtooth, should be adjusted to equal the normal servo input level (or vice versa). Connections are branched from the other end terminal of this resistor via conductor 35 to that plate of condenser 31 which is connected to the input of the servo amplifier 27, and also to one end terminal of a second resistor 37. The opposite end terminal of the latter is connected to the plate 22b of triode 22.

The electronic and sonic components which have been described above function in accordance with the following principles to measure airspeed.

Symbols used hereinafter are defined as follows:

$d$=distance between transmitter 12 and each of the receivers 10 and 11.
$c$=speed of sound in still air.
$v$=airspeed (motion of air relative to the system is in the direction shown by the "relative wind" arrow).
$t_1$=time required by transmitted pulse to travel from transmitter 12 to receiver 11.
$t_2$=time required by sonic pulse to travel from transmitter 12 to receiver 10.

From an analysis of Fig. 1 it is seen that:

$$t_1 = \frac{d}{c+v}$$

$$t_2 = \frac{d}{c-v}$$

$$\therefore v = \frac{d}{2}\left(\frac{1}{t_1} - \frac{1}{t_2}\right) = \frac{d}{2}\left(\frac{t_2-t_1}{t_1 t_2}\right) \quad (1)$$

It has already been stated that the slope of the sawtooth voltage wave 19 produced by generator 18 is proportional to the setting of the potentiometer arm 23a. Since generation of wave 19 continues for the time period $t_1$, it follows that the amplitude of this wave, which I shall designate as $E_1$, must be proportional to airspeed $v$ multiplied by $t_1$. That is, $E_1$ varies as $vt_1$, and appears at the output of detector unit 33. Accordingly, the voltage drop across resistor 34 and hence the amount of charge put into condenser 31 will likewise vary as $vt_1$.

The gating voltage 16, previously referred to, alternately turns tube 22 on and off. Hence, the average current $i$ flowing through this tube which is obtained by way of discharge from the condenser 31 through resistor 37 will be proportional to $$\frac{t_2-t_1}{t_2}$$

To measure speed, the setting of the potentiometer arm 23a which determines the slope of the sawtooth voltage wave 19 is automatically adjusted so that the amount of charge put into condenser 31 during the period $t_1$ always equals the amount of charge taken out of this condenser during period $t_2-t_1$. Under these conditions, the average voltage at point 38 is thus held constant. In other words, the equation $$vt_1 \alpha \frac{t_2-t_1}{t_2} \quad (2)$$

is always satisfied.

Equation 2 will be recognized as the same as Equation 1 except for the factor $$\frac{d}{2}$$

which may be considered the proportionality constant.

Operation of the system is as follows: Each time that a pulse transmitted from the transmitter unit 12 reaches the "up-wind" receiver 10, the voltage pulse generated therein causes the trigger circuit 15 to momentarily energize transmitter 12 and thereby emit a new pulse. Also simultaneously with pulse emission, the trigger circuit 15 functions to supply a negative gating signal 16 to the grid 22a of triode 22. This same signal is also delivered to the sawtooth wave generator 18. The effect of the negative gating signal at this point is to start the generation of the sawtooth wave 19 and to cut off current flow in the plate-cathode circuit of tube 22.

Now, when the transmitted pulse reaches the "down-wind" receiver 11, the voltage produced therein when impressed upon trigger circuit 15 swings the gating voltage 16 from negative to positive. The effect of this is to cut off the voltage wave 19 and to simultaneously initiate the flow of current $i$ in the plate-cathode circuit of tube 22.

The above cycle of operation is continuous with the result that in each cycle, condenser 31 will be charged by the voltage drop across resistor 34 during the time that the gating signal is negative and will be discharged through the resistor 37 and the plate-cathode circuit of tube 22 during the time that the gating signal is positive. The current in 37 is intermittent, but the current in 34 is continuous, since $E_d$ is a D.-C. potential proportional to $vt_1$. To state it another way, condenser 31 receives charging current during the time that the wave generator 18 is producing the sawtooth voltage wave 19 and is discharged during the time that the grid 22a of triode 22 is swung positive by the gating signal voltage. Thus, in order to satisfy Equation 1, it is seen that the net charge put into condenser 31 during the time that the sawtooth wave generator 18 is generating voltage $E_1$ must be equal to the net charge removed from this condenser as is discharges through resistor 37 during the time the tube 22 is in a conductive state.

It has been explained previously that the slope of the sawtooth voltage wave 19 is determined by the setting of potentiometer arm 23a. Since the amount of the charging current taken by condenser 31 is proportional to the slope of the sawtooth voltage wave 19, it is evident that the amount of the charging current fed into condenser 31 may be varied by changing the setting of the potentiometer arm 23a. The apparatus is calibrated in still air by adjusting the setting of potentiometer arm 23a so that the amount of charge put into condenser 31 is the same as the discharge taken therefrom during any one cycle. Under this condition, a pulse emitted by transmitter 12 will reach receivers 10 and 11 simultaneously, and $t_1$ thus becomes equal to $t_2$ and $t_2-t_1=0$. Charge and discharge of 31 are equal, to be sure, but only because both $t_2$ and $t_1$ are equal. Now when the apparatus is placed into operation, and the air is blowing in the direction indicated by the arrow, $t_1$ is no longer equal to $t_2$, and hence the amount of charge put into condenser 31 will no longer be equal to the charge taken therefrom. Consequently, the voltage at point 38 will change. The effect upon the change in voltage at point 38 on the servo amplifier unit 27 is such as will cause the latter to produce an output which will cause the motor 25 to rotate. Rotation of motor 25 changes the setting of potentiometer arm 23a and hence effects a change in the slope of the sawtooth voltage wave 19. The effect of this is to change the amount by which condenser 31 is charged during the time that the gating signal 16 is negative. Operation of motor 25 continues until potentiometer arm 23a reaches a position such that the amount of current put into the condenser 31, during the time that the sawtooth wave generator 19 is operated, is just equal to the amount of current discharged by the condenser 31 each time that the tube 22 is rendered conductive. When this condition of equilibrium has been reached, the voltage E at point 38 becomes stabilized and rotation of motor 25 is then stopped. Thus, for every change in airspeed, the system operates to change the position of the potentiometer arm 23a until equilibrium in the system has been reestablished.

Figure 9:
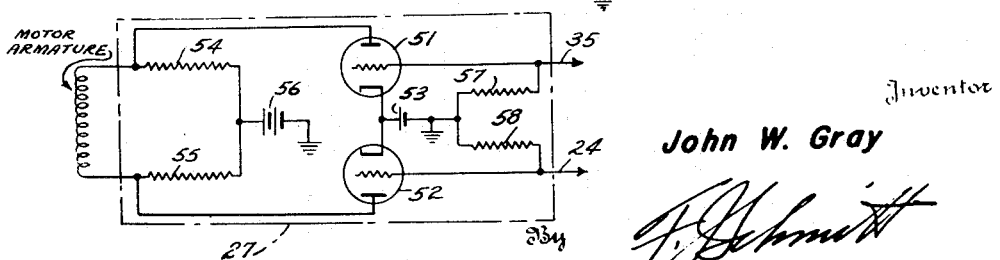
Fig. 9 is a schematic electrical circuit diagram of a suitable servo amplifier.

A suitable amplifier circuit, Fig. 9, for the servo amplifier 27 may comprise a pair of balanced electron discharge tubes 51 and 52, with the cathodes thereof connected together and through bias source 53 to ground. Leads 35 and 24 are connected to the control grids of the respective tubes, and through equal high impedance resistors 57 and 58 respectively to ground. The anodes of the tubes are connected through equal load resistors 54 and 55 to the positive terminal of a source of anode potential 56 which has the negative terminal thereof connected to ground. The motor may have a permanent or fixed field magnet, and an armature winding having the terminals thereof connected to the respective anodes. In the operation of this circuit, as long as the signals on the two leads 24 and 35 are equal, no potential difference will exist across the armature winding; any inequality will cause energization of the winding, the current flowing therethrough in two directions selectively in accordance with which signal exceeds the other. The above described circuit constitutes no part of the instant invention.

It thus follows that the setting of the potentiometer arm 23a will always be indicative of airspeed and can be so calibrated by any suitable indicator means such as a graduated scale 39 and pointer 40.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Apparatus for determining airspeed comprising, an up-wind sonic receiver, a down-wind sonic receiver, a sonic pulse transmitter disposed intermediate said receivers, a wave generator, means tripping on said generator each time that a sonic pulse reaches one of said receivers and then off when said pulse reaches the other receiver, means effecting emission of a new pulse from said transmitter each time a pulse reaches one of said receivers, a condenser, connections between said generator and condenser, a discharge path for said condenser, means rendering said path nonconductive when said generator is on and conductive when said generator is off, and means responsive to a change in the average voltage of said condenser effected by a change in airspeed for modifying the wave produced by said generator in order to maintain said apparatus in a state of equilibrium.

2. Apparatus for determining airspeed comprising, an up-wind sonic receiver, a down-wind sonic receiver, a sonic pulse transmitter disposed intermediate said receivers, a wave generator, means tripping off said generator each time a sonic pulse reaches said down-wind receiver and then on as said pulse reaches said up-wind receiver, means effecting emission of a new pulse from said transmitter each time said up-wind receiver receives a pulse, a condenser, connections between the output of said generator and said condenser, a discharge path for said condenser, means rendering said path conductive when said generator is off and nonconductive when said generator is on, and means responsive to a change in the average voltage on said condenser effected by a change in airspeed for modifying the wave produced by said generator in order to maintain said apparatus in a state of equilibrium.

3. The combination in claim 2 and further including airspeed indicator means controlled by the last recited means thereof.

4. Apparatus for determining airspeed comprising, a pair of sonic pulse receivers, one of which is placed up-wind and the other down-wind, a sonic pulse transmitter disposed intermediate said receivers, a trigger circuit controlled by the resective outputs of said receivers, said trigger circuit being tripped in one direction when a sonic pulse reaches one of said receivers to deliver a gating signal of a predetermined polarity and being tripped in the other direction when said pulse reaches the other said receiver to reverse the polarity of said gating signal and to simultaneously therewith effect emission of a new sonic pulse from said transmitter, a wave generator, means for modifying the wave produced by said generator, a condenser, connections between the output of said generator and said condenser, a discharge path for said condenser, circuit means feeding said gating signal to said generator for controlling operation thereof and also to said discharge path, said generator being tripped on and said discharge path being rendered nonconductive when said gating signal is of one polarity and vice versa when said gating signal is of reversed polarity, and means automatically responsive to the average voltage on said condenser for altering the effect of said generator wave modifying means in accordance with a change in airspeed to maintain said apparatus in a state of equilibrium.

5. Apparatus for determining airspeed comprising, a pair of sonic pulse receivers, one of which is placed up-wind and the other down-wind, a sonic pulse transmitter disposed intermediate said receivers, a trigger circuit controlled by the respective outputs of said receivers, said trigger circuit being tripped in one direction when a sonic pulse reaches said down-wind receiver to deliver a gating signal of a predetermined polarity and being tripped in the other direction when said pulse reaches said up-wind receiver to reverse the polarity of said gating signal and to simultaneously therewith effect emission of a new pulse from said transmitter, a sawtooth wave generator, means for adjusting the slope of the wave produced by said generator, a condenser, connections between the output of said generator and said condenser, a discharge path for said condenser, circuit means feeding said gating signal to said generator for controlling operation thereof and also to said discharge path, said generator being tripped on and said discharge path being rendered nonconductive when said gating signal is of said predetermined polarity and vice versa when said gating signal is of reversed polarity, and means automatically responsive to the average voltage on said condenser for changing the setting of said slope adjusting means for said generator in accordance with a change in airspeed to maintain said apparatus in a state of equilibrium.

6. Apparatus for determining airspeed comprising, a pair of sonic receivers, one of which is placed up-wind and the other down-wind, a sonic pulse transmitter disposed intermediate said receivers, a trigger circuit controlled by the respective outputs of said receivers, said trigger circuit being tripped in one direction when a sonic pulse reaches said down-wind receiver to deliver a gating signal of a predetermined polarity and being tripped in the other direction when said pulse reaches said up-wind receiver to reverse the polarity of said gating signal and to simultaneously therewith effect emission of a new pulse from said transmitter, a sawtooth wave generator, a potentiometer for adjusting the slope of the wave produced by said generator, a peak detector connected to the output of said generator, a condenser, connections between the output of said detector and condenser, a discharge path for said condenser, circuit means feeding said gating signal to said generator for controlling operation thereof and also to said discharge path, said generator being tripped on and said discharge path being rendered nonconductive when said gating signal is of said predetermined polarity and vice versa when said gating signal is of reversed polarity, and motor means automatically responsive to the voltage on said condenser for changing the setting of said potentiometer in accordance with a change in airspeed so as to maintain said apparatus in a state of equilibrium.

7. Apparatus for determining airspeed comprising, a pair of sonic receivers, one of which is placed up-wind and the other down-wind, a sonic pulse transmitter disposed intermediate said receivers, a trigger circuit controlled by the respective outputs of said receivers, said trigger circuit being tripped in one direction when a sonic pulse reaches said down-wind receiver to deliver a positive gating signal and being tripped in the other direction when said pulse reaches said up-wind receiver to deliver a negative gating signal and to simultaneously therewith effect emission of a new pulse from said transmitter, a sawtooth wave generator, a potentiometer for adjusting the slope of the wave produced by said generator, a condenser, connections between the output of said generator and said condenser, a discharge path for said condenser, said path including a discharge valve, circuit means feeding said gating signal to said generator for controlling operation thereof and also to said discharge valve, said generator being tripped on and said discharge valve being rendered non-conductive when said gating signal is negative and vice versa when said gating signal is positive, and motor means automatically responsive to the voltage on said condenser for changing the setting of said potentiometer in accordance with a change in airspeed so as to maintain said apparatus in a state of equilibrium.

8. The combination in claim 7 and further including a speed indicator controlled by said motor means.

JOHN W. GRAY.

REFERENCES CITED

The following references are of record in the file of this patent:

UNITED STATES PATENTS

| Number | Name | Date |
| --- | --- | --- |
| 2,050,866 | Tamm | Aug. 11, 1936 |
| 2,151,203 | Hartig | Mar. 21, 1939 |
| 2,250,708 | Herz | July 29, 1941 |
| 2,274,262 | Wolff | Feb. 24, 1942 |
| 2,371,415 | Tolson | Mar. 13, 1945 |
| 2,404,894 | Willis | July 30, 1946 |